July 21, 1959     A. W. SCRIBNER     2,895,211
METAL CUTTING
Filed Dec. 27, 1956
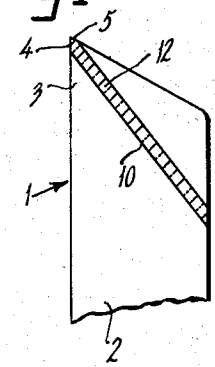
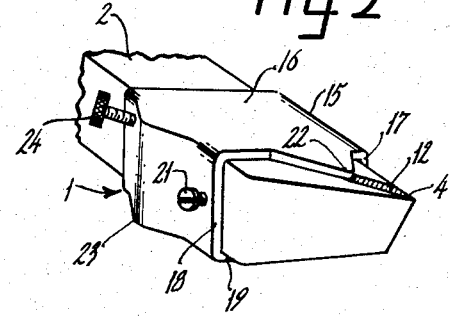
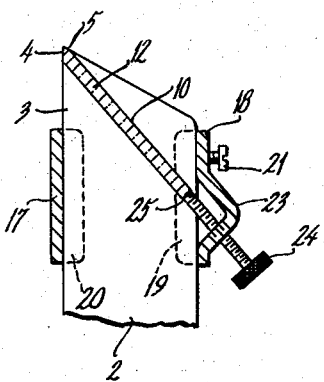
INVENTOR
ALBERT W. SCRIBNER

2,895,211
METAL CUTTING

Albert W. Scribner, West Hartford, Conn.

Application December 27, 1956, Serial No. 630,941

1 Claim. (Cl. 29—106)

This invention relates to a novel means and method for cutting metals. More particularly the instant invention contemplates the provision of an improved system for the lubrication of the operative surfaces of a metal cutting tool.

In the various metal cutting operations, such as turning, boring, planing etc., a tool is brought into cutting engagement with the workpiece to thereby remove a portion of the work material. The operative pressures and temperatures existing in the region of the cutting edge of the tool during such operations may become very high depending, inter alia, on the nature of the work material and on the cutting speeds used. Under extreme conditions the tool cutting edges readily become dull and the power required by the cutting apparatus is thereby increased. Any extended use of a tool which does not have a proper edge reduces both the allowable cutting speeds and the overall efficiency of the cutting operation.

To overcome these difficulties various systems have been proposed for lubricating the operative surfaces of the tool. These systems however have not been entirely satisfactory primarily because of the difficulty encountered in getting the lubricant to the comparatively inaccessible portions of the tool which are actually cutting the work material.

One object of the instant invention is to provide a novel method and apparatus for cutting metal.

Another object of the instant invention is to provide a novel means for effectively lubricating the operative surfaces of a metal cutting tool as the latter progressively cuts the work material.

A further object of the invention is to provide a novel means for applying a solid fusible lubricant to the cutting edges of a metal working tool.

Other objects will appear as the disclosure progresses.

In the drawings:

Figure 1 is a partial plan view of a conventional type cutting tool that is modified in accordance with the instant invention.

Figure 2 is an isometric view of the lubricant supporting and feeding device.

Figure 3 is a sectional view taken in the plane of the upper surface of the tool shown in Figure 2.

Although the instant invention may be utilized in conventional turning operations, particular reference is here made to metal cutting operations in which the working forces between the work material and the tool are comparatively large. Such conditions will exist when "heavy cuts" are made as in certain boring and planing operations. During these cutting operations the temperatures and pressures in the region of the tool cutting edge may become as high as 1000 degrees Fahrenheit and 4,000 pounds per square inch. Under these conditions it is apparent that the tool material in the region of the cutting edge will readily wear and that conventional type lubricants are apt to evaporate even if successfully brought to said cutting edge.

The instant invention contemplates the positionment of a solid but fusible material adjacent the tool cutting edge whereby the extreme temperature and pressure conditions will cause said material to progressively fuse or melt thus providing a lubricant film between the metal being cut and the operative surfaces of said tool. The solid fusible material preferably comprises a vitreous substance such as a borosilicate glass or the like. Said vitreous material may be in any one of several different physical forms such as spun, fiber, powdered or plate glass.

Referring to Figure 1 there is shown a conventional type cutting tool 1 having a shank portion 2, a cutting portion 3 and cutting edges 4 and 5. In the upper face of the tool there is formed a channel or groove 10 extending from either or both of said cutting edges 4 and 5 to the righthand side of the tool. In this groove or channel is positioned a strip 12 of said fusible lubricant, said strip having a cross sectional profile corresponding to that of said channel 10 whereby the upper surface of said strip is flush with, or slightly below, the tool surfaces adjacent said channel. During a cutting operation that portion of said strip 12 which is immediately adjacent the said cutting edges will gradually soften and melt under the high working temperatures and pressures. This portion of the strip then being in a viscous state will be free to flow over the tool surfaces defining said cutting edges and will thereby provide a lubricant film between the work metal and the tool. That portion of the said strip 12 farther away from said cutting edges will remain in the solid state and will be advanced and secured in said channel in a manner described below.

Figure 2 shows a means for adjustably securing the lubricant material 12 in said tool 1. A clamp bracket 15 having an upper horizontal portion 16, side portions 17 and 18 and shoulders 19 and 20 is secured to said tool by means of a set screw 21 which threadedly engages said side portion 18 and abuts the side wall of the tool 1. The bracket portion 16 has a forward extension 22 the lower surface of which, in cooperation with the lower surface of said portion 16, overlies the upper surfaces of said strip 12 and said tool portion 3. On the bracket side portion 18 is formed a projection 23 which is threadedly engaged by the feed screw 24. The inner end 25 of said feed screw abuts the righthand or remote end of said strip 12 thus allowing strip 12 to be advanced along the groove 10 upon rotation of said screw. The rotation of screw 24 may be affected manually, or automatically through means cyclically actuated by the machine operation. The upper surface of the forward end of said extension 22 tapers toward the upper surface of the tool so that there will be no significant amount of interference thereof with the flow of metal being cut.

The fusible strip 12 may be comprised of any one of the various known materials, such as mica, which have fusion characteristics similar to that described above for glasses. For a given cutting operation the particular material to be used will be that which has a fusion temperature within the range of temperatures generated by said given cutting operation.

It is apparent that the angular disposition of said strip 12 with respect to the cutting edges 4 and 5 may be varied in accordance with the nature of the cutting operation. Also, the groove 10 may comprise a passageway formed through the body of said tool portion 3. If desired that portion of the strip 12 immediately adjacent the cutting edges may be heated or softened prior to making the initial cut of the metal working operation thereby avoiding any initial cracking or chipping of said strip prior to the time when the operative portions of the tool reach working temperatures.

Having illustratively described the principles of the invention, I claim:

In combination with a metal cutting tool having a shank portion and a cutting portion; the mutually adjacent faces of said cutting portion cooperatively defining the tool cutting edge: the improvement comprising a layer of solid but fusible lubricant material disposed in a channel that is formed in said cutting portion; said channel extending from said cutting edge to a region of said tool remote from said cutting edge, and said layer of lubricant material being movable along the length of said channel; bracket means connected to said tool; and lubricant material feeding means mounted on said bracket means and engaging said lubricant material for progressively advancing said lubricant material along the length of said channel towards said cutting edge.

References Cited in the file of this patent

UNITED STATES PATENTS

| | | |
|---|---|---|
| 160,161 | Clay | Feb. 23, 1875 |
| 522,588 | Chauteau | July 10, 1894 |
| 1,961,304 | Ricard | June 5, 1934 |
| 1,967,020 | Caufield | July 17, 1934 |
| 2,430,083 | Sherman | Nov. 4, 1947 |
| 2,588,625 | Ferner | Mar. 11, 1952 |
| 2,706,850 | Sejournet | Apr. 26, 1955 |

FOREIGN PATENTS

| | | |
|---|---|---|
| 599,449 | Great Britain | Mar. 12, 1948 |